Patented Dec. 21, 1926.

1,611,461

UNITED STATES PATENT OFFICE.

PHILIP A. KOBER, OF HASTINGS-ON-HUDSON, NEW YORK.

MANUFACTURE OF SODIUM SALT OF 3.3'-DIAMINO-4.4'-DIHYDROXYARSENOBENZENE.

No Drawing. Application filed April 12, 1920. Serial No. 373,235.

This invention relates to the production of a stable sodium salt of 3-3'-diamino-4-4'-dihydroxy-arseno-benzene.

In order to inject arsphenamine into the body, it is desirable to convert it, after dissolving, from the hydrochloride, which is an acid salt, into an alkaline salt. Thus, when a solution of the dihydrochloride is treated with caustic soda solution it is converted into the disodium salt of the free base. This neutralization is commonly effected by the physician at the time of administration.

It has not heretofore been feasible, in so far as I am aware, to prepare and isolate the pure sodium salt in a stable form, so that it is directly available for use. Thus U. S. Patent No. 1,191,997 points out that the pure alkali metal salts of arsphenamine base are unstable, and this patent proposes to overcome this difficulty by compounding the sodium salts with stabilizing agents, particularly polyhydric alcohol. According to other proposals, the arsphenamine is compounded with sodium hydrosulphite, formaldehyde-sulfoxylate, etc., in order to prepare the product in a stable form. Accordingly, the products heretofore available, while they may contain the disodium salt of arsphenamine base, contain this product in admixture with considerable amounts of impurities. Products which have heretofore been available, as made by those skilled in the art, thus contain around 43 to 49 per cent of impurities; and the U. S. Hygenic Laboratory finds and allows the arsenic content of the sodium salt of arsphenamine base of different manufacturers to be from around 19 to 21 per cent, although the chemically pure anhydrous arsphenamine calls for an arsenic content of about 36.6 per cent.

I have now found that a substantially pure sodium salt of arsphenamine base can be prepared in a simple and advantageous manner and in a stable form, with an arsenic content approximating the theoretical, and free from objectionable impurities such as alcohol of crystallization, or as addition products. The invention will be further illustrated by the following more detailed description of the preferred practice thereof:

36.6 grams of arsphenamine base are suspended in 400 cc. of distilled water and dissolved in 50 cc. of twice normal sodium hydroxide. 1000 cc. of boiling water are then added, and then enough five normal hydrochloric to reprecipitate all of the arsphenamine base, about 20 cc. of the five normal hydrochloric acid being sufficient. The precipitate is then filtered and washed with distilled water. This preliminary treatmeant is for the purpose of purifying the arsphenamine base and separating it from impurities with which it may be admixed. The precipitated and filtered product is, therefore, a product of high purity.

The precipitated base, after filtering and washing, and while still admixed with the water remaining after the filtration, is agitated or whipped or beaten into a stiff paste or cream. There is then added, with stirring, about 83 cc. of twice normal caustic soda until almost all of the paste has been dissolved. Excess caustic soda is avoided, and this can readily be effected by leaving a small amount of the precipitate undissolved, thereby avoiding any excess of free alkali. The solution of the sodium salt thus obtained is filtered through cotton to remove undissolved material and then evaporated to dryness under a high vacuum, for example, a vacuum of two to ten millimetres of pressure, that is, an absolute pressure corresponding to such a mercury column, and at a relatively low temperature that is at a suitable water bath temperature of about 50 to 80° C. The dried product may contain one or more molecular proportions of water, if it is not completely dried. In the above example, if a more concentrated caustic soda solution is used, a correspondingly less amount of water will require to be evaporated.

The sodium salt produced in the manner above described is a product of high purity and is likewise a product of great stability, well adapted for manufacture and storage, for example, in sealed ampules containing an indifferent gas. It is free from excess free alkali, and also free from any objectionable by-products.

I claim:

1. In a method of producing the sodium salt of arsphenamine base wherein the arsphenamine base is purified in an aqueous solution, the steps of dissolving the purified base while still admixed with water in a caustic soda solution while avoiding excess of caustic soda, and evaporating the resulting solution to dryness under a high vacuum.

2. The method of producing the sodium salt of arsphenamine base which comprises dissolving purified arsphenamine base in caustic soda solution, using insufficient caustic soda to dissolve all of the base, thereby avoiding excess of free alkali, filtering the resulting solution and evaporating the solution to dryness under a vacuum sufficient to cause evaporation at a relatively low temperature.

3. In a method of producing the sodium salt of arsphenamine base wherein a purified base is obtained by dissolving arsphenamine base in caustic soda solution and forming a hot solution, reprecipitating the base from such solution with hydrochloric acid, and filtering and washing the precipitate, the steps of dissolving the precipitate while still admixed with water in caustic soda while avoiding excess of free alkali, and evaporating the resulting solution to dryness under a vacuum sufficient to cause evaporation at a relatively low temperature.

4. The method of producing the sodium salt of arsphenamine base which comprises dissolving a purified arsphenamine base in flocculent form admixed with water in caustic soda solution, avoiding excess of caustic soda, and evaporating the resulting solution to dryness under a vacuum sufficient to cause evaporation at a relatively low temperature.

5. As a new product, the sodium salt of arsphenamine base in the form of the sodium salt of the free base, the product being stable, substantially pure, and containing approximately 36.6% of arsenic.

In testimony whereof I affix my signature.

PHILIP A. KOBER.